United States Patent
Tojo

(10) Patent No.: US 8,942,478 B2
(45) Date of Patent: Jan. 27, 2015

(54) INFORMATION PROCESSING APPARATUS, PROCESSING METHOD THEREFOR, AND NON-TRANSITORY COMPUTER-READABLE STORAGE MEDIUM

(75) Inventor: Hiroshi Tojo, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 38 days.

(21) Appl. No.: 13/270,708

(22) Filed: Oct. 11, 2011

(65) Prior Publication Data

US 2012/0106849 A1 May 3, 2012

(30) Foreign Application Priority Data

Oct. 28, 2010 (JP) ................................. 2010-242651

(51) Int. Cl.
*G06K 9/34* (2006.01)
*G06T 7/00* (2006.01)
*G06T 7/20* (2006.01)

(52) U.S. Cl.
CPC ............. *G06T 7/0081* (2013.01); *G06T 7/2053* (2013.01); *G06T 2207/20144* (2013.01)
USPC ....................................................... 382/173

(58) Field of Classification Search
USPC ....................................................... 382/173
IPC .............. G06K 9/34,9/00442, 9/00456, 9/3233, G06K 9/325, 9/6267, 9/00281, 9/00268, G06K 9/0063, 9/00664, 9/00671, 9/38, 9/46, G06K 9/4604, 9/623; G06T 2207/10016, G06T 9/00, 2207/20144, 2207/20148, 3/0056, G06T 7/0083, 2207/30242, 2210/22, 3/00, G06T 5/00; H04N 2101/00; G06F 17/30247, G06F 17/30253, 17/30277, 17/3028, 17/274, G06F 17/2854, 17/30, 17/3025
See application file for complete search history.

(56) References Cited

U.S. PATENT DOCUMENTS

| | | | |
|---|---|---|---|
| 6,731,799 B1* | 5/2004 | Sun et al. ........................ | 382/173 |
| 2004/0228530 A1* | 11/2004 | Schwartz et al. ............... | 382/173 |
| 2005/0180642 A1* | 8/2005 | Curry et al. .................... | 382/232 |
| 2005/0276446 A1* | 12/2005 | Chen et al. ..................... | 382/103 |
| 2006/0193516 A1* | 8/2006 | Toyama et al. ................. | 382/173 |
| 2007/0273765 A1* | 11/2007 | Wang et al. .................... | 348/152 |
| 2008/0030579 A1* | 2/2008 | Kelly et al. ..................... | 348/154 |
| 2008/0095435 A1* | 4/2008 | Lipton et al. ................... | 382/173 |
| 2008/0152236 A1* | 6/2008 | Vendrig et al. ................. | 382/224 |
| 2008/0187219 A1* | 8/2008 | Chen et al. ..................... | 382/173 |
| 2008/0219554 A1* | 9/2008 | Dorai et al. ..................... | 382/173 |
| 2009/0060277 A1* | 3/2009 | Zhang et al. .................... | 382/103 |
| 2009/0087093 A1* | 4/2009 | Eaton et al. ..................... | 382/173 |
| 2010/0201820 A1* | 8/2010 | Lopota et al. .................. | 348/152 |

FOREIGN PATENT DOCUMENTS

| | | |
|---|---|---|
| JP | 2002099909 A | 4/2002 |
| JP | 2009-048240 A | 3/2009 |

\* cited by examiner

*Primary Examiner* — Jingge Wu

(74) *Attorney, Agent, or Firm* — Fitzpatrick, Cella, Harper & Scinto

(57) ABSTRACT

An image processing apparatus acquires an image; sets a plurality of partial regions for the acquired image, and acquiring an image feature amount including a plurality of frequency components from each of the partial regions; compares the acquired image feature amount with an image feature amount of a background model which holds, for each of the partial regions, an image feature amount of an image as a background; updates, based on the comparison result, each of a plurality of frequency components included in the image feature amount held in the background model using the acquired image feature amount by a degree according to each of the frequency components; and detects, using the background model updated in the updating, for each of the partial regions, a region where a target object to be detected exists.

8 Claims, 8 Drawing Sheets

FIG. 5A

| BACKGROUND MODEL MANAGEMENT INFORMATION | POSITION INFORMATION | POINTER | | |
|---|---|---|---|---|
| | 1 | 1200 | | |
| | 2 | 1202 | | |
| | ⋮ | ⋮ | | |
| BACKGROUND MODEL INFORMATION | POINTER | STATUS NUMBER | FEATURE AMOUNT | CREATION TIME |
| | ADDRESS 1200 | 1 | {0, 100, -400} | 0 |
| | ADDRESS 1201 | 2 | {100, 0, 300} | 101 |
| | ADDRESS 1202 | 1 | {0, 120, -400} | 0 |
| | ADDRESS 1203 | 2 | {500, 100, 0} | 180 |
| | ⋮ | ⋮ | ⋮ | ⋮ |

BLOCK NUMBER 1 (covering ADDRESS 1200 and ADDRESS 1201)

FIG. 5B

| POSITION INFORMATION | STATUS NUMBER | MINIMUM DIFFERENCE VALUE |
|---|---|---|
| 1 | 1 | 30 |
| 2 | 2 | 120 |
| ⋮ | ⋮ | ⋮ |

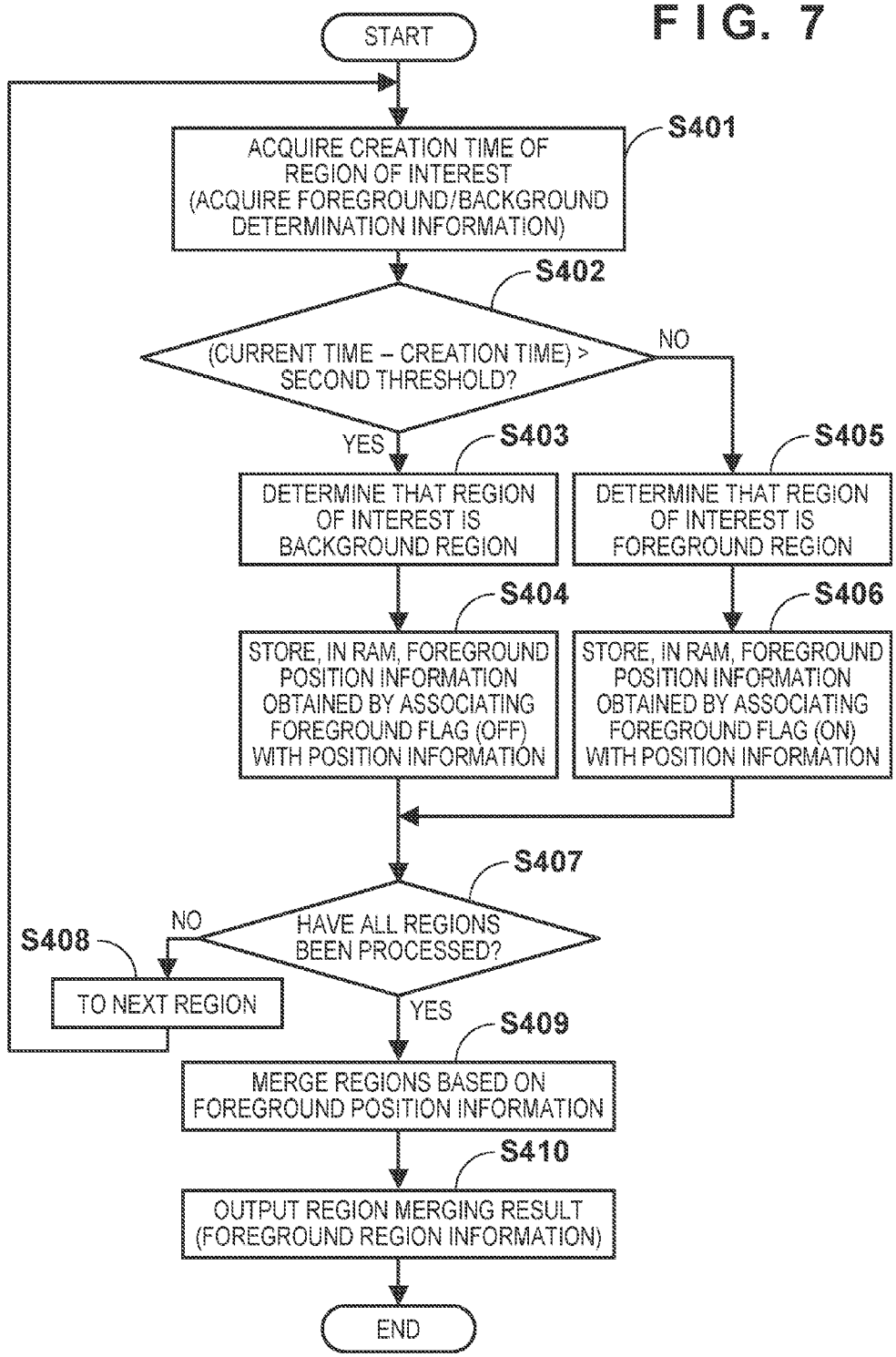

FIG. 8A

| POSITION INFORMATION | CREATION TIME |
|---|---|
| 1 | 1 |
| 2 | 180 |
| ⋮ | ⋮ |

FIG. 8B

| POSITION INFORMATION | FOREGROUND FLAG |
|---|---|
| 1 | OFF |
| 2 | ON |
| ⋮ | ⋮ |

FIG. 8C

| NUMBER OF FOREGROUND REGIONS | a, aaa, aaa |
|---|---|
| UPPER LEFT COORDINATES 1 | (x1-1, y1-1) |
| LOWER RIGHT COORDINATES 1 | (x1-2, y1-2) |
| UPPER LEFT COORDINATES 2 | (x2-1, y2-1) |
| LOWER RIGHT COORDINATES 2 | (x2-2, y2-2) |
| ⋮ | ⋮ |

INFORMATION PROCESSING APPARATUS, PROCESSING METHOD THEREFOR, AND NON-TRANSITORY COMPUTER-READABLE STORAGE MEDIUM

BACKGROUND OF THE INVENTION

1. Field of the Invention

The present invention relates to an information processing apparatus, a processing method therefor, and a non-transitory computer-readable storage medium.

2. Description of the Related Art

A technique is known of using a background subtraction method to detect an object from an image sensed by an image sensing apparatus (for example, a camera). In the background subtraction method, a fixed camera senses a background image with no object, and stores it in advance. Then, the difference between the image input from the camera and the background image stored in advance is obtained, thereby detecting an object region based on the obtained difference.

Note that the background may change with time. For example, the brightness of the background changes depending on a change in illumination. In this case, a difference arises between the sensed image and the stored background image, and thus a background region may be erroneously detected as an object.

To avoid erroneous detection due to a change in background, there is provided a method of updating a background image based on an input image. If the input image contains an object, the object will influence the background image. To avoid this, Japanese Patent Laid-Open No. 2002-99909 has disclosed a technique for excluding a detected object region from target regions of background update processing.

Assume, however, that an object whose color and brightness are similar to those of the background passes in a series of images. In this case, since a sufficient difference does not arise between the object and the background, it is impossible to accurately detect the object similar to the background. In the method described in Japanese Patent Laid-Open No. 2002-99909, the object similar to the background is also reflected in updating the background image, and therefore, the background image changes from the original background. In this case, a background region after the object passes is erroneously detected as an object.

SUMMARY OF THE INVENTION

The present invention provides a technique for detecting a target object using a background model which holds an image feature amount having a plurality of frequency components while updating the background model by the degree of update which is different for each of the plurality of frequency components.

According to a first aspect of the present invention there is provided an image processing apparatus comprising: an image acquisition unit configured to acquire an image; a feature amount acquisition unit configured to set a plurality of partial regions for the image acquired by the image acquisition unit, and acquire an image feature amount including a plurality of frequency components from each of the partial regions; a holding unit configured to hold, as a background model, an image feature amount of an image as a background for each of the partial regions; a comparison unit configured to compare, for each of the partial regions, the image feature amount of the background model with the image feature amount acquired by the feature amount acquisition unit; an update unit configured to update, based on the comparison result of the comparison unit, each of a plurality of frequency components included in the image feature amount held in the background model using the image feature amount acquired by the feature amount acquisition unit by a degree according to each of the frequency components; and a detection unit configured to detect, using the background model updated by the update unit, for each of the partial regions, a region where a target object to be detected exists.

According to a second aspect of the present invention there is provided a processing method for an information processing apparatus, comprising: acquiring an image; setting a plurality of partial regions for the acquired image, and acquiring an image feature amount including a plurality of frequency components from each of the partial regions; comparing the acquired image feature amount with an image feature amount of a background model which holds, for each of the partial regions, an image feature amount of an image as a background; updating, based on the comparison result, each of a plurality of frequency components included in the image feature amount held in the background model using the acquired image feature amount by a degree according to each of the frequency components; and detecting, using the background model updated in the updating, for each of the partial regions, a region where a target object to be detected exists.

According to a third aspect of the present invention there is provided a non-transitory computer-readable storage medium storing a computer program for causing a computer to functions as an image acquisition unit configured to acquire an image, a feature amount acquisition unit configured to set a plurality of partial regions for the image acquired by the image acquisition unit, and acquire an image feature amount including a plurality of frequency components from each of the partial regions, a holding unit configured to hold, as a background model, an image feature amount of an image as a background for each of the partial regions, a comparison unit configured to compare, for each of the partial regions, the image feature amount of the background model with the image feature amount acquired by the feature amount acquisition unit, an update unit configured to update, based on the comparison result of the comparison unit, each of a plurality of frequency components included in the image feature amount held in the background model using the image feature amount acquired by the feature amount acquisition unit by a degree according to each of the frequency components, and a detection unit configured to detect, using the background model updated by the update unit, for each of the partial regions, a region where a target object to be detected exists.

Further features of the present invention will be apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 5A is a table showing an example of a background model;

FIG. 5B is a table showing an example of minimum difference value information;

FIG. 7 is a flowchart illustrating an example of foreground/background determination processing shown in step S104 of FIG. 3;

FIG. 8A is a table showing an example of foreground/background determination information;

FIG. 8B is a table showing an example of foreground position information; and

FIG. 8C is a table showing an example of foreground region information.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(First Embodiment)

Figure 1:
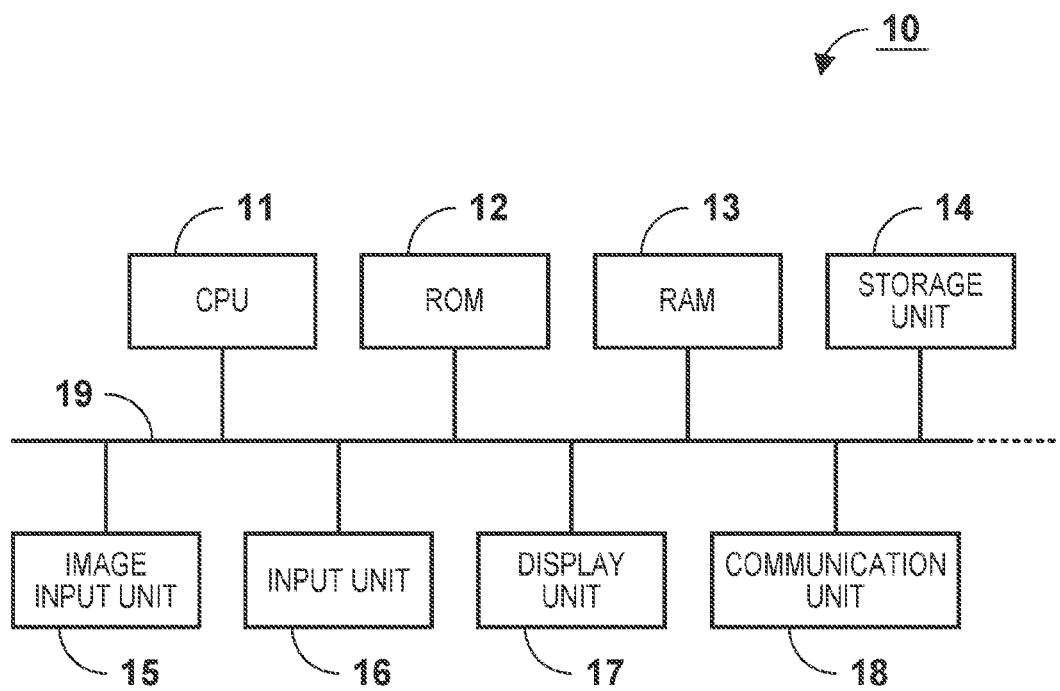
FIG. 1 is a block diagram showing an example of the hardware configuration of an image processing apparatus 10 according to an embodiment of the present invention.

FIG. 1 is a block diagram showing an example of the hardware configuration of an image processing apparatus 10 according to an embodiment of the present invention.

The image processing apparatus 10 inputs a frame image every predetermined period of time, and uses a background model to detect, from the frame image, a target object to be detected. At this time, the image processing apparatus 10 executes background model update processing according to this embodiment. This allows to accurately detect a target object from a frame image even if an object having a portion similar to the background passes in a series of images or a change in illumination occurs in a series of images.

The image processing apparatus 10 includes a CPU 11, a ROM 12, a RAM 13, a storage unit 14, an image input unit 15, an input unit 16, a display unit 17, and a communication unit 18. Note that these components are communicably connected with each other via a bus 19.

The CPU (Central Processing Unit) 11 comprehensively controls the operation of each component via the bus 19. The ROM (Read Only Memory) 12 is a nonvolatile memory storing various programs and the like. Note that the ROM 12 may be configured to be writable. The RAM (Random Access Memory) 13 is a volatile memory for temporarily storing various data (for example, a frame image). The RAM 13 is used as, for example, a work area when the CPU 11 performs various processes.

The storage unit 14 is implemented by, for example, a flash memory, an HDD (Hard Disk Drive), or a DVD-RAM (Digital Versatile Disk Random Access Memory), and stores various kinds of information. The storage unit 14 stores, for example, image feature amounts and programs.

The image input unit 15 is implemented by, for example, an image sensing apparatus (a digital video camera, a network camera, an infrared camera, or the like), and inputs a frame image to the apparatus every predetermined period of time. The communication unit 18 is implemented by, for example, a network I/F or USB, and communicates with another apparatus to exchange various data.

The input unit 16 is implemented by, for example, a keyboard, mouse, or touch panel, and inputs an instruction from the user to the apparatus. The display unit 17 is implemented by, for example, a liquid crystal panel, and displays various screens to the user. The example of the hardware configuration of the image processing apparatus 10 has been described. Note that the hardware configuration shown in FIG. 1 is merely an example, and the image processing apparatus 10 is not necessarily implemented by such a configuration. For example, a component corresponding to the image input unit 15 may be provided outside the image processing apparatus 10. In this case, a frame image is input to the image processing apparatus 10 via, for example, a storage medium (for example, a USB memory) or the communication unit 18.

Figure 2:
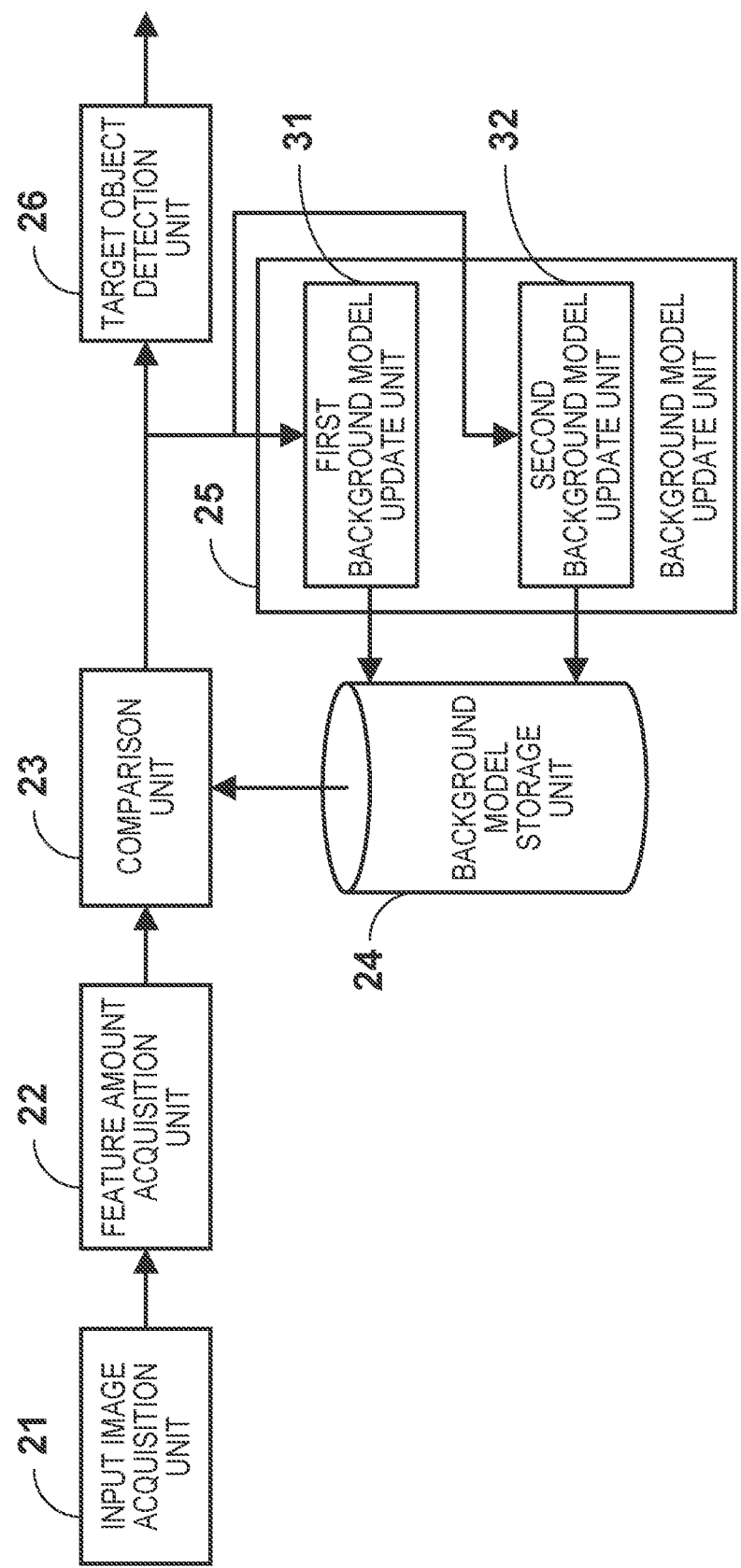
FIG. 2 is a block diagram showing an example of a functional configuration implemented by a CPU 11, a storage unit 14, and the like shown in FIG. 1.

An example of the functional configuration of the image processing apparatus 10 implemented by the CPU 11, the storage unit 14, and the like shown in FIG. 1 will be described next with reference to FIG. 2.

The functional configuration of the image processing apparatus 10 includes an input image acquisition unit 21, a feature amount acquisition unit 22, a comparison unit 23, a background model storage unit 24, a background model update unit 25, and a target object detection unit 26.

The input image acquisition unit 21 acquires, every predetermined period of time, a frame image input to the apparatus by the image input unit 15.

The feature amount acquisition unit 22 acquires an image feature amount from a plurality of partial regions within the frame image acquired by the input image acquisition unit 21. In this embodiment, as an example of the image feature amount, DCT coefficients calculated for each partial region (8×8 pixel block) are used. It is possible to obtain DCT coefficients by performing discrete cosine transform.

Of the DCT coefficients, coefficients up to the third coefficient of a luminance Y component are used as an image feature amount according to this embodiment. More specifically, one coefficient indicating a DC component and two coefficients each indicating an AC component are used as the image feature amount. The image feature amount acquired by the feature amount acquisition unit 22 includes a plurality of feature amounts with different spatial frequencies.

If the frame image has been compression-encoded in a JPEG format, it means that an image feature amount has been extracted in image compression. In this case, DCT coefficients are directly extracted from the frame image in a JPEG format, and are used as an image feature amount.

The comparison unit 23 compares the image feature amount of a region of interest (a partial region to be processed) within the frame image with the image feature amount of a region corresponding to the region of interest in a background model, and calculates the difference between them.

The background model storage unit 24 is implemented by the RAM 13, the storage unit 14, or the like, and stores a background model. The background model will be described in detail later. In the background model, each status of each position within the frame image is defined as an image feature amount.

The background model update unit 25 has a function of updating, based on the comparison result of the comparison unit 23, the background model stored in the background model storage unit 24, and includes a first background model update unit 31 and a second background model update unit 32. In this embodiment, the first background model update unit 31 executes background model update processing for the image feature amount of an alternating current component (AC component), and the second background model update unit 32 executes background model update processing for the image feature amount of a direct current component (DC component). That is, the first background model update unit 31 and the second background model update unit 32 respectively update different components of the image feature amount of each position within the background model.

The target object detection unit 26 uses the background model stored in the background model storage unit 24 to determine whether each partial region within the frame image is the foreground (a target object) or the background (an object other than a target object), and then detects a partial region where a target object exists.

The example of the functional configuration implemented by the CPU 11, the storage unit 14, and the like shown in FIG. 1 has been described. Each functional component other than the background model storage unit 24 is implemented when, for example, the CPU 11 uses the RAM 13 or the like as a work area to read out a program stored in the ROM 12, the storage unit 14, or the like, and execute the readout program. Some or all of the functional components may be implemented as an integrated circuit chip. A component corresponding to the background model storage unit 24 may be provided outside the image processing apparatus 10.

An example of an overall processing procedure in the image processing apparatus 10 shown in FIG. 1 will be explained with reference to FIG. 3.

The image input unit 15 senses an image, and inputs a frame image to the apparatus every predetermined period of time, and the input image acquisition unit 21 acquires the frame image (S101). The feature amount acquisition unit 22 calculates an image feature amount from the acquired frame image. The comparison unit 23 then calculates the difference between the calculated image feature amount and a corresponding image feature amount within the background model stored in the background model storage unit 24 (S102).

The first background model update unit 31 executes the first background update processing for the AC components of the background model stored in the background model storage unit 24. The second background model update unit 32 executes the second background update processing for the DC component of the background model stored in the background model storage unit 24 (S103).

After the background model is updated, the target object detection unit 26 determines, for the frame image acquired in step S101, whether each region is a background region or is not a background region (that is, a foreground region). The foreground region is a region where a target object exists. The target object detection unit 26 outputs a region (foreground region=target object region) other than the background region (S104). This, for example, causes the display unit 17 to display rectangle frames each surrounding a foreground region or the like on the foreground regions within the input frame image.

After that, if the user sends an end instruction (for example, powers off) (YES in step S105), the image processing apparatus 10 ends this processing; otherwise (NO in step S105), the process returns to step S101.

The difference calculation processing shown in step S102 of FIG. 3 will be described in detail with reference to FIG. 4.

In this processing, the feature amount acquisition unit 22 first acquires the image feature amount of a region of interest (a partial region to be processed) within the frame image (S201). The comparison unit 23 acquires the image feature amount of a region corresponding to the region of interest from the background model stored in the background model storage unit 24 (S202).

The background model stored in the background model storage unit 24 will now be explained with reference to FIG. 5A.

In the background model, an image feature amount is defined for each partial region within the frame image. The image feature amount is defined for each status. The background model mainly includes two elements, that is, background model management information and background model information.

The background model management information includes position information and a pointer. The position information indicates the position of a partial region (a block with 8×8 pixels) within the frame image. In this case, numbers sequentially assigned to the blocks of the frame image from the upper left to the lower right are used. If, for example, an image has 640×480 pixels, numbers 1 to 4800 are assigned to blocks.

The background model information holds a plurality of statuses for each partial region. The purpose of this configuration is to deal with the background which changes due to appearance of a new static object (for example, a vase) or the like. Each status holds a status number for identifying the status, an image feature amount representing the status, and a creation time (time information) when the status is first created within the background model. Note that although, in this embodiment, a frame number is used as a creation time, a time expression using the hour, minute, and second may be used as a creation time, as a matter of course.

A plurality of statuses for the same position (partial region) within the frame image are sequentially stored in a location which is pointed by the pointer of the background model management information. In the example shown in FIG. 5A, for a block number "1", statuses are stored at addresses "1200" and "1201". More specifically, a status with a status number "1" for the block number "1" is stored at the address "1200", and a status with a status number "2" for the block number "1" is stored at the address "1201". To read out all statuses for a region of interest, therefore, pointers for the region of interest and the next partial region are acquired from the background model management information, and then values at addresses from the address of the region of interest to an address immediately before the address of the next partial region are acquired.

Referring back to step S202, the comparison unit 23 refers to the pointer to the background model information of the region of interest using the background model management information, and acquires an image feature amount corresponding to one of the statuses.

The comparison unit 23 compares the image feature amount of the region of interest within the frame image with the image feature amount of the region corresponding to the region of interest in the background model, and calculates the difference between them (S203). The unit 23 then stores, in the RAM 13 or the like, the difference value in association with a position within the frame image. As a method of calculating a difference, for example, a method of calculating the absolute value of the difference between DCT coefficients of an image feature amount acquired from the frame image and a corresponding image feature amount acquired from the background model, and using the total of the absolute values as a difference value is used. Note that the present invention is not limited to this method, and the total of the squares of respective difference values may be used as a difference value.

The image processing apparatus 10 determines whether there exists a status, in the current region of interest, in which a difference value has not been calculated. This determination is made based on whether a pointer to a partial region succeeding the region of interest has been read out from the background model management information.

As a result of the determination processing, if a status in which a difference value has not been calculated exists (NO in step S204), the image processing apparatus 10 acquires the image feature amount of the next status from the background model (S205), and repeats the above-described processing in steps S202 to S204.

Alternatively, if the image feature amounts of all the statuses of the current region of interest have been acquired (YES in step S204), the comparison unit 23 selects a minimum value from all the difference values calculated for the current region of interest (S206). The unit 23 then stores, in the RAM 13, as minimum difference value information, information obtained by associating the minimum difference value, a corresponding status number, and a position (partial region) within the frame image. The minimum difference value information is stored in the RAM 13 in a form shown in FIG. 5B.

The image processing apparatus 10 determines whether the above-described processing has been executed for all the partial regions within the frame image. If the processing has been executed (YES in step S207), the process ends; otherwise (NO in step S207), the apparatus 10 executes the above-described processing for the next partial region (S208). More specifically, by starting from the upper left partial region of the frame image, the above-described processing is executed for all the partial regions within the frame image while moving from left to right and then moving downward for each row.

Note that when the image processing apparatus 10 performs the processing for the first time, a background model holding appropriate values is not stored. In this case, the apparatus 10 executes the processing using a dummy background model in which a predetermined value (for example, a maximum value) is set for all partial regions.

The background model update processing (the first background model update processing and the second background model update processing) shown in step S103 of FIG. 3 will be explained in detail with reference to FIG. 6.

Figure 3:
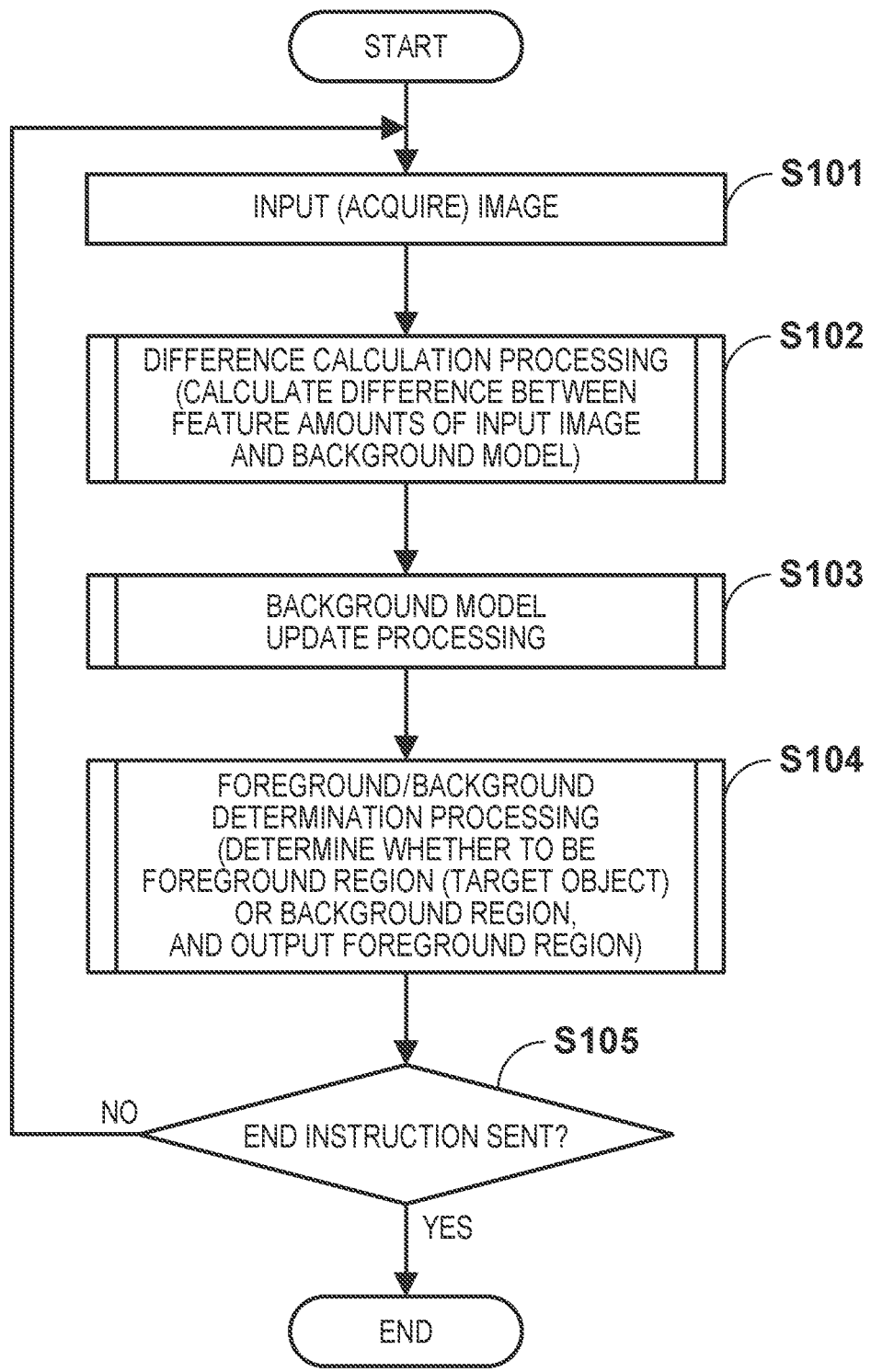
FIG. 3 is a flowchart illustrating an example of an overall processing procedure in the image processing apparatus 10 shown in FIG. 1.
Figure 4:
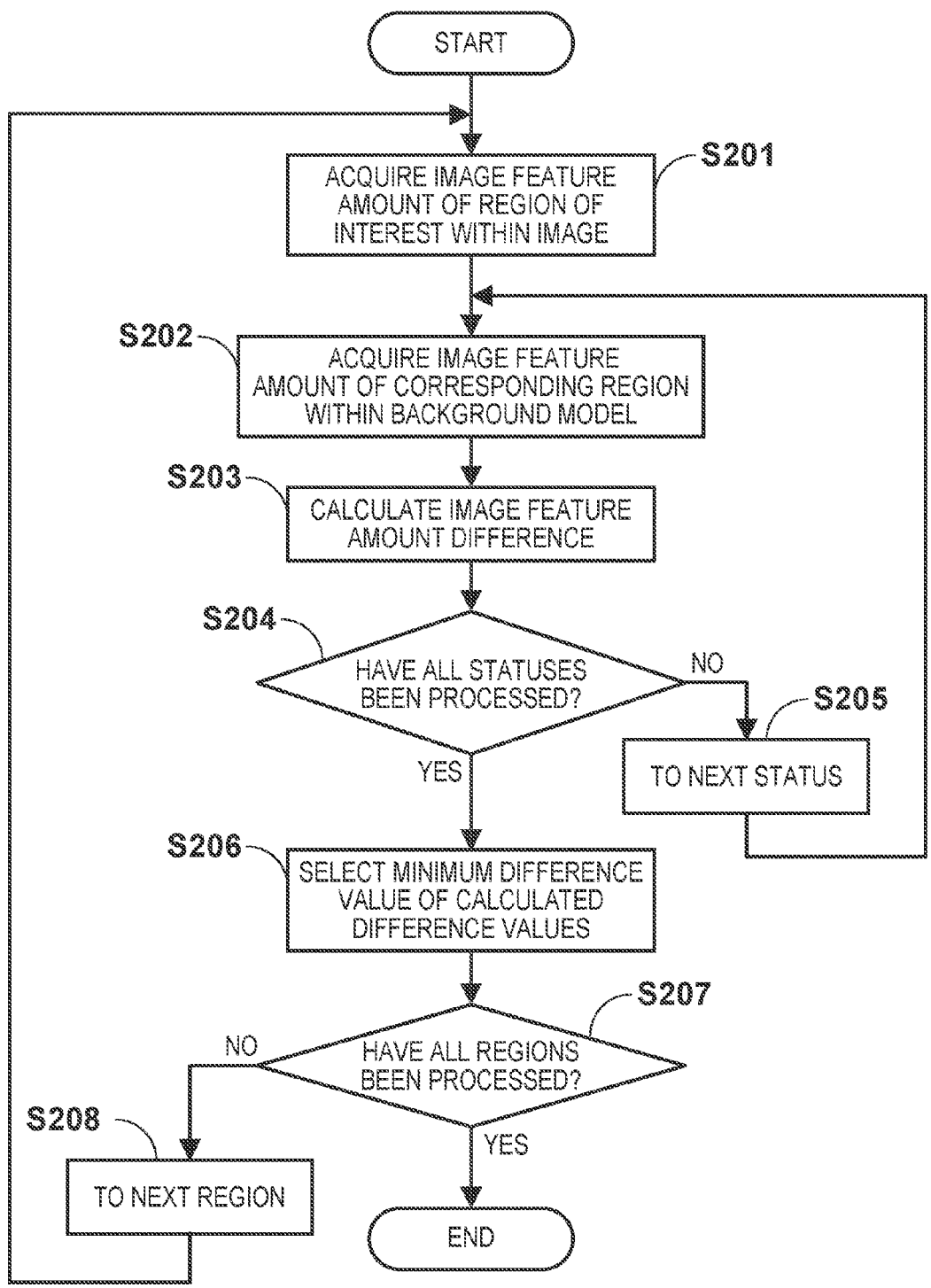
FIG. 4 is a flowchart illustrating an example of difference calculation processing shown in step S102 of FIG. 3.

Upon start of the processing, the background model update unit 25 acquires the minimum difference value (minimum difference value information) as the result of the difference calculation processing (step S102 shown in FIG. 3).

The background model update unit 25 compares the minimum difference value of the region of interest with the first threshold. The first threshold serves as a criterion of determination whether the region of interest is similar to the background model.

If the difference value is not larger than the first threshold (YES in step S302), the background model update unit 25 determines that the region of interest is similar to a corresponding status held in the background model. The background model update unit 25, therefore, refers to a corresponding status number within the minimum difference value information shown in FIG. 5B, and updates the image feature amount of the status.

The processing will be described in detail later. The first background model update unit 31 updates the AC components of the DCT coefficients of the status of the region of interest (S303). The second background model update unit 32 updates the DC component of the DCT coefficient of the status of the region of interest (S304). After that, the background model update unit 25 acquires a creation time registered in advance in association with the updated status (S305), and stores, in the RAM 13, foreground/background determination information obtained by associating the creation time with the position of the region of interest (S308). The foreground/background determination information is information obtained by associating position information with a creation time, as shown in FIG. 8A, and is used in the foreground/background determination processing shown in step S104 of FIG. 3.

If it is determined in step S302 that the difference value exceeds the first threshold (NO in step S302), the background model update unit 25 determines that the region of interest is not similar to the status held in the background model, and is therefore determined as a new status. The background model update unit 25 registers, in the background model, the image feature amount of the region of interest as the image feature amount of the new status (S306). The unit 25 also registers the current time as a creation time in association with the registered image feature amount (S307). Then, the background model update unit 25 stores, in the RAM 13, the foreground/ background determination information obtained by associating the creation time with the position of the region of interest (S308).

After the foreground/background determination information is stored in the RAM 13, the image processing apparatus 10 determines whether the above-described processing has been executed for all the partial regions within the frame image. If the processing has been executed (YES in step S309), the processing ends; otherwise (NO in step S309), the above-described processing is executed for the next partial region (S310). More specifically, by starting from the upper left partial region within the frame image, the above-described processing is executed for all the partial regions within the frame image while moving from left to right and then moving downward for each row.

Note that when the image processing apparatus 10 performs the processing for the first time, it executes the above-described processing using a dummy background model in which a predetermined value (for example, a maximum value) is set for all partial regions. In this case, the region of interest is determined as a new status in the determination processing in step S302 of FIG. 6, and all image feature amounts are added to the background model.

A practical example of the background model update processing shown in steps S303 and S304 of FIG. 6 will be explained.

As described above, this embodiment is directed to implement a background model which allows target object detection even when an object having a portion similar to the background passes in a series of images or a change in illumination occurs in a series of images.

Only a luminance or tint changes when a change in illumination occurs in a series of images. In terms of DCT coefficients, a DC component changes but AC components do not change. On the other hand, assume that an object having a portion similar to the background passes in a series of images. In this case, in terms of DCT coefficients, since the object is similar to the background, a DC component does not change much but AC components change due to the contours of the object.

In consideration of this, a change in DC component is likely caused by a change in illumination, and should be, therefore, actively used to update the background model. On the other hand, a change in AC component likely occurs when an object similar to the background passes, and should not be, therefore, actively used to update the background model. It is thus possible to update the background model according to the two situations described above by setting the degree of background update of the DC component larger than that of the AC component.

Three examples of a method of changing the degree of background update according to each frequency component of an image feature amount will be explained.

In the first background update method, a background model is updated by changing a weight for each component of an image feature amount. The first background model update unit 31 and the second background model update unit 32 respectively execute update processing using $$\mu_{AC,t} = (1-\alpha) \cdot \mu_{AC,t-1} + \alpha \cdot I_{AC,t} \quad (1)$$

$$\mu_{DC,t} = (1-\beta) \cdot \mu_{DC,t-1} + \beta \cdot I_{DC,t} \quad (2)$$

In this case, "t" represents the current frame image, "t−1" represents an immediately preceding frame image, "$\mu_{AC,t-1}$" represents the value of an AC component before update, "$\mu_{DC,t-1}$" represents the value of a DC component before update, "$\mu_{AC,t}$" represents the value of the AC component after update, "$\mu_{DC,t}$" represents the value of the DC component after update, "$I_{AC,t}$" represents the value of the AC component of the frame image, and "$I_{DC,t}$" represents the value of the DC component of the frame image. Each of α and β is a weight having a value between 0 and 1. As this weight is larger, the value after update is closer to the input value (input frame image), that is, a percentage of the input value reflected in the background model is higher. Therefore, α<β, which means that the weight of the input value of the DC component is set larger than that of the AC component.

In the first background update method, the first background model update unit 31 updates an AC component according to equation (1), and the second background model update unit 32 updates a DC component according to equation (2).

The second background update method will be explained next. In the second background update method, the background model is updated by changing an upper limit value of an update amount for each component of an image feature amount. The first background model update unit 31 and the second background model update unit 32 respectively execute update processing using $$\mu_{AC,t} = \min(\max(\mu', \mu_{AC,t-1} - \delta_{AC}), \mu_{AC,t-1} + \delta_{AC}) \quad (3)$$

$$\mu_{DC,t} = \min(\max(\mu', \mu_{DC,t-1} - \delta_{DC}), \mu_{DC,t-1} + \delta_{DC}) \quad (4)$$

$$\mu' = (1-\alpha) \cdot \mu_{k,t-1} + \alpha \cdot I_{k,t}; \ k = \{AC, DC\} \quad (5)$$

For equation (5), as compared with equations (1) and (2), the same α is used as a coefficient for AC and DC components. In equation (3), "$\delta_{AC}$" represents an upper limit value of an update amount for one update operation of an AC component, and "$\delta_{DC}$" represents an upper limit value of an update amount for one update operation of a DC component. In this case, "$\delta_{AC} < \delta_{DC}$", which means that the upper limit value of a background update amount of a DC component is set larger than that of an AC component.

In the second background update method, the first background model update unit 31 updates an AC component according to equation (3), and the second background model update unit 32 updates a DC component according to equation (4).

The third background update method will be described next. In the third background update method, the background model is updated by changing an update frequency for each component of an image feature amount. In the third background update method, the number of times the first background model update unit 31 and second background model update unit 32 need to perform an update operation (the number of times YES is determined in step S302 of FIG. 6) is stored for each status of each partial region. When the number of times an update operation is needed reaches a predetermined number ($N_{AC}$, $N_{DC}$) of times, an update operation is performed according to:

$$\mu_{k,t} = (1-\alpha) \cdot \mu_{k,t-1} + \alpha \cdot I_{k,t}; \ k = \{AC, DC\} \quad (6)$$

In this case, "$N_{AC} > N_{DC}$", which means that the background update frequency of a DC component is higher than that of an AC component.

In the third background update method, when the number of times the first background model update unit 31 needs to perform an update operation reaches "$N_{AC}$", the unit 31 updates an AC component according to equation (6) (k=AC). When the number of times the second background model update unit 32 needs to perform an update operation reaches "$N_{DC}$", the unit 32 updates a DC component according to equation (6) (k=DC).

In this embodiment, a case in which the background model is updated according to the first background update method will be explained. That is, the first background model update unit 31 updates an AC component according to equation (1) (step S303 of FIG. 6). Then, the second background model update unit 32 updates a DC component according to equation (2) (step S304 of FIG. 6).

The foreground/background determination processing shown in step S104 of FIG. 3 will be described in detail with reference to FIG. 7.

Figure 6:
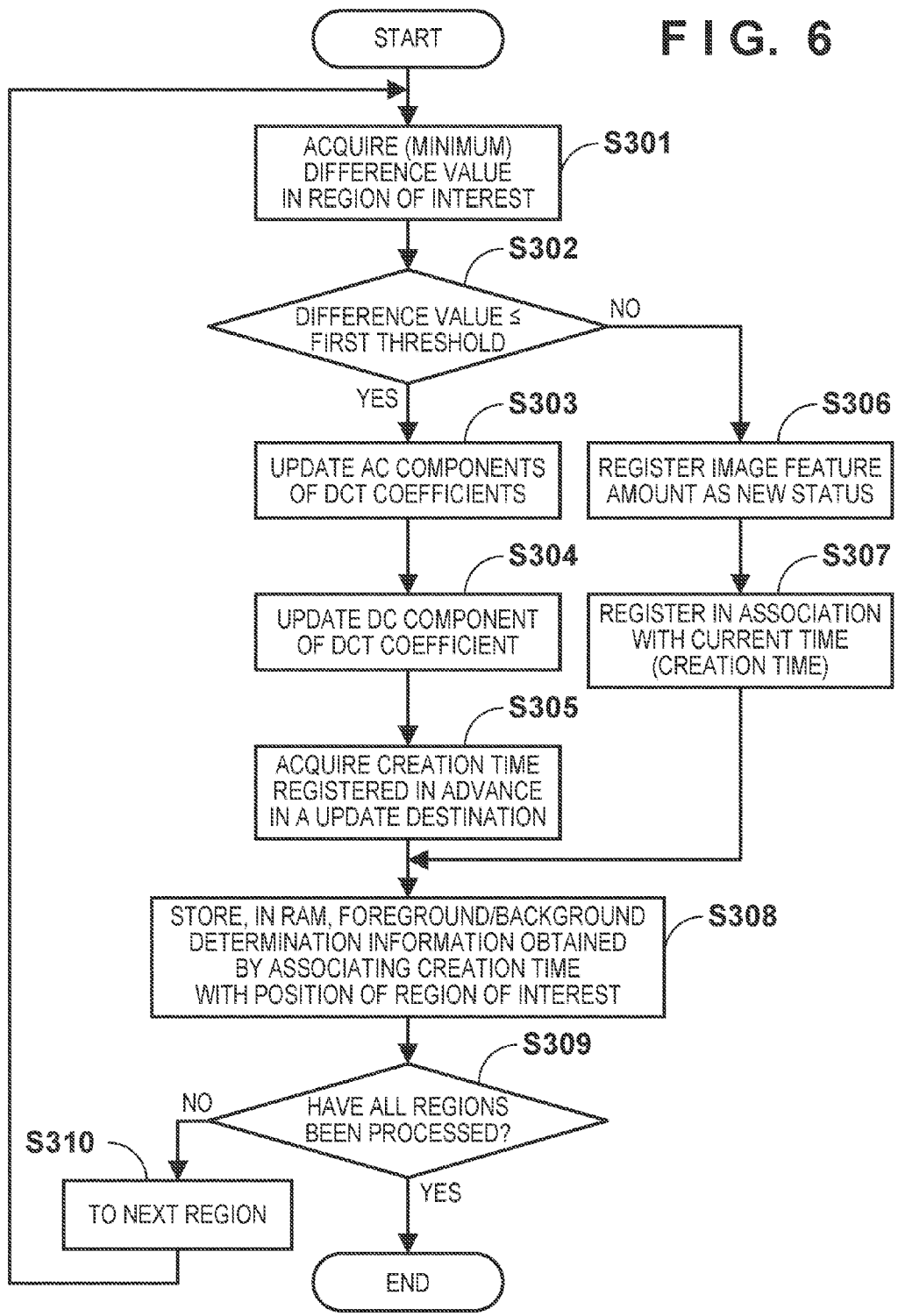
FIG. 6 is a flowchart illustrating an example of background model update processing shown in step S103 of FIG. 3.

Upon start of this processing, the target object detection unit 26 acquires the foreground/background determination information (FIG. 8A) which has been stored in the RAM 13 in the processing in step S308 of FIG. 6, and also acquires a creation time and position information for a region of interest (S401).

The target object detection unit 26 subtracts the creation time acquired in the processing in step S401 from the current time, and compares the value obtained after the subtraction operation with the second threshold. The value obtained after the subtraction operation indicates a time from when a corresponding status appears first within a series of frame images until now. If, therefore, the value (time) obtained after the subtraction operation is sufficiently large, the region of interest is determined as a background. That is, the second threshold serves as a criterion of determination whether the region of interest is the background or foreground.

If, as a result of the determination, the value obtained after the subtraction operation exceeds the second threshold (YES in step S402), the target object detection unit 26 determines that the region of interest is the background (S403), and stores, in the RAM 13, foreground position information obtained by associating a foreground flag (off) with the position information acquired in the processing in step S401 (S404). As shown in FIG. 8B, the foreground position information is obtained by associating the foreground flag with the position information. Note that the foreground flag indicates whether the region of interest is the foreground (a target object). If the region of interest is the foreground, the foreground flag (on) is set; otherwise (that is, the region of interest is the background), the foreground flag (off) is set.

If, as a result of the determination in step S402, the value obtained after the subtraction operation is not larger than the second threshold (NO in step S402), the target object detection unit 26 determines that the region of interest is the foreground (S405). The unit 26 stores, in the RAM 13, foreground position information obtained by associating the foreground flag (on) with the position information acquired in the processing in step S401 (S406).

After storing the foreground position information in the RAM 13, the image processing apparatus 10 determines whether the above-described processing has been executed for all the partial regions within the frame image. If the processing has not been executed (NO in step S407), the apparatus 10 executes the above-described processing for the next partial region (S408). More specifically, by starting from the upper left partial region within the frame image, the above-described processing is executed for all the partial regions within the frame image while moving from left to right and then moving downward for each row.

If the apparatus 10 has executed the above-described processing for all the partial regions (YES in step S407), the target object detection unit 26 merges the partial regions of the frame image based on the foreground position information (S409), and then ends the processing. More specifically, if, with reference to the foreground position information (FIG. 8B), neighboring partial regions are the foreground, the unit 26 regards the partial regions as one region (merging of regions), derives the bounding rectangle of the region, and creates foreground region information. As shown in FIG. 8C, the foreground region information includes the number of foreground regions, and the upper left coordinates (x1-1, y1-1) and the lower right coordinates (x1-2, y1-2) of the bounding rectangle of each foreground region.

The region merging processing is not indispensable, and the foreground position information (FIG. 8B) may be output intact. Whether the foreground position information is output or the foreground region information is output may be determined based on, for example, operation settings and the like.

As described above, according to this embodiment, a target object is detected using a background model which holds an image feature amount having a plurality of frequency components while updating the background model by the degree of update which is different for each of the plurality of frequency components. More specifically, the background model is updated by setting the degree of background update of a DC component of the image feature amount larger than that of an AC component.

This makes it possible to accurately detect a target object as compared with the conventional configuration even when an object having an image feature amount similar to that of the background passes in a series of images or a change in illumination occurs in a series of images.

The representative embodiment of the present invention has been explained. The present invention, however, is not limited to the above-described embodiment shown in the accompanying drawings, and can be implemented by modifying, as needed, the embodiment within the spirit and scope of the present invention.

(Modification 1)
A case in which an image feature amount is acquired for each partial region (each block with 8×8 pixels) has been described above. The present invention, however, is not limited to this. A partial region may have a smaller or larger size. For example, an image feature amount may be acquired for each partial region including a 1×1 block, that is, each pixel. In this case, there is known a method of using the luminance value and edges of each pixel as an image feature amount. As a method of extracting edge features, there is known a method of performing, for each pixel and its surrounding pixels, an operation using a differentiation filter. An example of the differentiation filter includes a Prewitt filter and Sobel filter. According to this modification, a partial region may have any size as long as it is possible to discriminate between a feature amount which becomes larger due to a change in illumination and a feature amount which considerably changes due to passage of an object.

(Modification 2)
In the above description, the background model (see FIG. 5A) holds a plurality of statuses for each partial region. The present invention is not limited to this, and the background model may be configured to have only one status.

(Modification 3)
In the above description, in the foreground/background determination processing (see FIG. 7), whether a region of interest is the foreground or background is determined based on a time from when a corresponding status appears first within a frame image until the current time. However, other methods may be used to determine whether a region of interest is the foreground or background. If, for example, a difference value calculated by the comparison unit 23 exceeds a predetermined threshold, a corresponding region may be determined as a foreground region.

(Modification 4)
In the above description, since the background model (see FIG. 5A) holds statuses for all partial regions, it also holds a status which has been determined as the foreground. The present invention, however, is not limited to this. For example, if a difference value calculated by the comparison unit 23 exceeds a predetermined threshold, a corresponding partial region is determined as a foreground region; otherwise, a corresponding partial region is determined as a background region. Then, only the image feature amount of a partial region determined as a background region may be held in a background model. That is, background model update processing may be executed for only the background based on the determination result of the target object detection unit 26.

(Modification 5)
Although the three examples of a method of changing the degree of background update for each frequency component of an image feature amount have been explained above, the present invention is not limited to this. Any method may be used as long as a plurality of background model update units can change the degree of update for an image feature amount (an AC component in this modification) influenced by passage of an object and an image feature amount (a DC component in this modification) influenced by a change in illumination.

(Modification 6)
Although a case in which coefficients up to the third coefficient of a luminance Y component of DCT coefficients are used as an image feature amount has been explained above, the present invention is not limited to this. As an image feature amount, for example, color components (color differences) Cr and Cb may be additionally used, or all DCT coefficients may be used.

(Modification 7)
Although a case in which two background model update units, that is, the first background model update unit 31 and the second background model update unit 32 are provided has been described above, the present invention is not limited to this and three or more background model update units may be provided. If, for example, a change in color due to a change in illumination is considered, it is necessary to handle a Cr component and Cb component of DCT coefficients as an image feature amount. In this case, changes in Cr and Cb components due to a luminance and color are not always uniform, and it is necessary to change the degree of update for each of the Cr and Cb components.

(Modification 8)
Although a case in which the first background model update unit 31 updates AC components and the second background model update unit 32 updates a DC component has been explained above, the present invention is not limited to this. For example, the first background model update unit 31 need only execute update processing for frequency components which change in a series of images when an object similar to the background passes in the series of images. For example, the unit 31 may update only high-frequency ones of all AC components.

The second background model update unit 32 need only execute update processing for frequency components which change in a series of images when a change in illumination occurs in the series of images. For example, the unit 32 may update low-frequency AC components in addition to the DC component.

That is, the first background model update unit 31 may update frequency components each having a frequency higher than a predetermined frequency, and the second background model update unit 32 may update frequency components each having a frequency not higher than the predetermined frequency.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-242651 filed on Oct. 28, 2010, which is hereby incorporated by reference herein in its entirety.

What is claimed is:

1. An image processing apparatus comprising:
an image acquisition unit configured to acquire an image;
a feature amount acquisition unit configured to acquire an image feature amount including an alternating current component and a direct current component from each of a plurality of partial regions in the acquired image;
a holding unit configured to hold, as a background model, an image feature amount of an alternating current component and a direct current component of a background image for each of the partial regions;
a comparison unit configured to compare, for each of the partial regions, the image feature amount of the background model with the image feature amount of the acquired image;
first and second update units configured to update the alternating current component and the direct current component for the partial region of the background model, respectively, if the partial region of the acquired image is similar to a corresponding region of the background model based on the comparison result of said comparison unit, using corresponding components for the partial region of the acquired image; and
a detection unit configured to detect, using the background model updated by said first and second update units, for each of the partial regions, a region where a target object to be detected exists, wherein a degree of update of the direct current component updated by the second update unit is larger than that of the alternating current component updated by the first update unit.

2. The apparatus according to claim 1, wherein said first and second update units update the background model by giving different weights to the respective components of the image feature amount acquired by said feature amount acquisition unit.

3. The apparatus according to claim 1, wherein said first and second update units update the background model by changing an upper limit value of an update amount for the respective components of the image feature amount acquired by said feature amount acquisition unit.

4. The apparatus according to claim 1, wherein said first and second update units update the background model by changing an update frequency for the respective components of the image feature amount acquired by said feature amount acquisition unit.

5. The apparatus according to claim 1, wherein the background model holds a plurality of image feature amounts for each of the partial regions,
wherein said comparison unit compares, for each of the partial regions, each of the plurality of image feature amounts of the background model with the image feature amount acquired by said feature amount acquisition unit to calculate a minimum image feature amount difference value,
wherein said first and second update units newly register, if the difference value exceeds a predetermined threshold, the image feature amount acquired by said feature amount acquisition unit in a corresponding partial region of the background model, and update, if the difference value is not larger than the predetermined threshold, an image feature amount of a corresponding partial region of the background model using the image feature amount acquired by said feature amount acquisition unit, and
wherein said detection unit detects a corresponding partial region as the region where a target object exists if a difference between a current time and time information associated with the image feature amount registered or updated by said first and second update units is not larger than a predetermined threshold.

6. The apparatus according to claim 1, wherein the background model holds a plurality of image feature amounts for one of the partial regions,
wherein said comparison unit compares, for each of the partial regions, each of the plurality of image feature amounts of the background model with the image feature amount acquired by said feature amount acquisition unit to calculate a minimum image feature amount difference value,
wherein said first and second update units newly register, if the difference value exceeds a predetermined threshold, the image feature amount acquired by said feature amount acquisition unit in a corresponding partial region of the background model, and update, if the difference value is not larger than the predetermined threshold, an image feature amount of a corresponding partial region of the background model using the image feature amount acquired by said feature amount acquisition unit, and
wherein said detection unit detects, as the region where a target object exists, a partial region whose difference value exceeds the predetermined threshold.

7. A processing method for an information processing apparatus, comprising:
- acquiring an image;
- acquiring an image feature amount including an alternating current component and a direct current component from each of a plurality of partial regions in the acquired image;
- comparing the acquired image feature amount with an image feature amount of a background model which holds, for each of the partial regions, an image feature amount including an alternating current component and a direct current component of a background image;
- updating, if the partial region of the acquired image is similar to a corresponding region of the background model based on the comparison result of said comparing step, respective the alternating current component and the direct current component for the partial region of the background model using corresponding components for the partial region of the acquired image; and
- detecting, using the background model updated in said updating step, for each of the partial regions, a region where a target object to be detected exists,
- wherein a degree of update of the updated direct current component is larger than that of the updated alternating current component.

8. A non-transitory computer-readable storage medium storing a computer program for causing a computer to function as:
- an image acquisition unit configured to acquire an image;
- a feature amount acquisition unit configured to acquire an image feature amount including an alternating current component and a direct current component from each of a plurality of partial regions in the acquired image;
- a holding unit configured to hold, as a background model, an image feature amount of an alternating current component and a direct current component of a background image for each of the partial regions;
- a comparison unit configured to compare, for each of the partial regions, the image feature amount of the background model with the image feature amount of the acquired image;
- first and second update units configured to update the alternating current component and the direct current component for the partial region of the background model, respectively, if the partial region of the acquired image is similar to a corresponding region of the background model based on the comparison result of said comparison unit, using corresponding components for the partial region of the acquired image; and
- a detection unit configured to detect, using the background model updated by said first and second update units, for each of the partial regions, a region where a target object to be detected exists,
- wherein a degree of update of the direct current component updated by the second update unit is larger than that of the alternating current component updated by the first update unit.

* * * * *